C. J. PFEIFER.
POULTRY FEEDER.
APPLICATION FILED OCT. 25, 1920.
1,398,041. Patented Nov. 22, 1921.
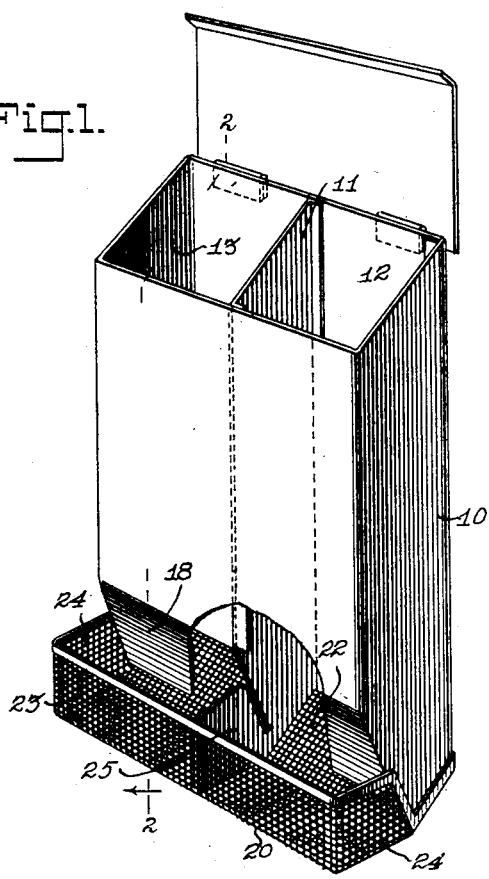
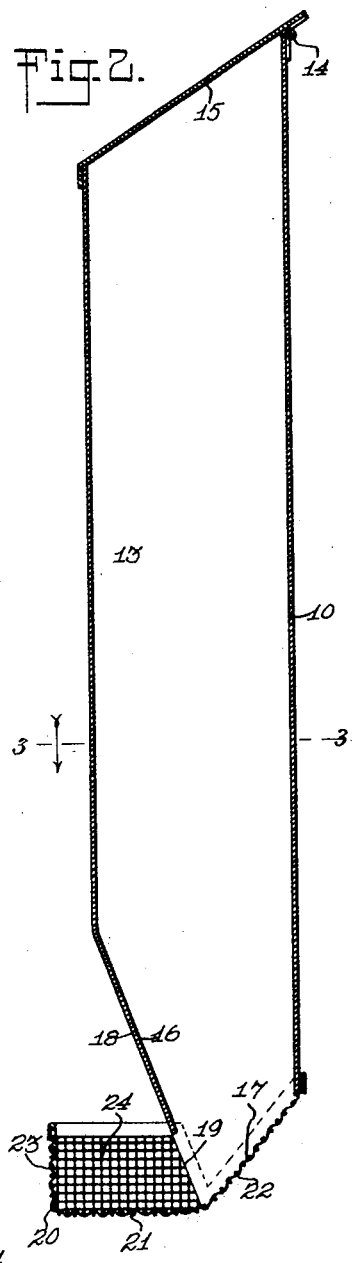
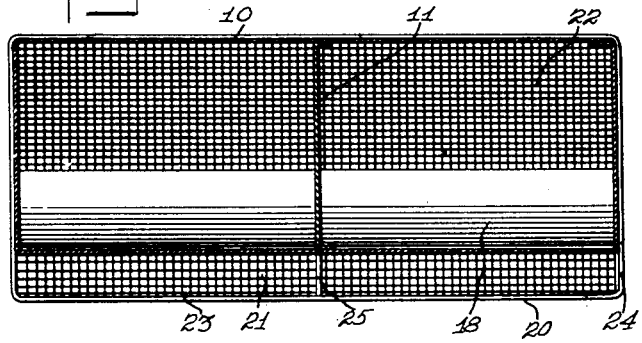
WITNESSES
INVENTOR
CONSTANT J. PFEIFER
BY
ATTORNEYS

UNITED STATES PATENT OFFICE.

CONSTANT J. PFEIFER, OF CALICOON, NEW YORK.

POULTRY-FEEDER.

1,398,041.  Specification of Letters Patent.  Patented Nov. 22, 1921.

Application filed October 25, 1920. Serial No. 419,288.

*To all whom it may concern:*

Be it known that I, CONSTANT J. PFEIFER, a citizen of the United States, and a resident of Calicoon, in the county of Sullivan and State of New York, have invented a new and Improved Poultry-Feeder, of which the following is a full, clear, and exact description.

This invention relates to an improvement in poultry feeding devices and is particularly designed as a device for feeding grit or ground oyster shells, although the same may be employed for feeding grain or similar food.

The invention contemplates and seeks for its principal object to provide a poultry feeder which affords means for sifting the contents of a gravity feed hopper whereby dirt, husks or other foreign particles are eliminated during the feeding operation.

Another object of the invention is to provide a device which is comparatively simple in construction, inexpensive to manufacture and highly efficient in its purpose.

With the above recited and other objects in view, some of which will appear hereafter, the invention resides in the novel construction, combination and arrangement of parts set forth in the specification, pointed out in the appended claims and illustrated in the accompanying drawings, in which:

Figure 1 is a perspective view of a poultry feeder constructed in accordance with the invention, with the hopper cover in open position, a part of the hopper being broken away to disclose the underlying structure.

Fig. 2 is a vertical sectional view therethrough taken approximately on the line 2—2 of Fig. 1.

Fig. 3 is a horizontal sectional view taken approximately on the line 3—3 of Fig. 2.

Referring to the drawings by characters of reference, 10 designates a rectangular hopper body which is provided with a vertical central partition 11 which separates the hopper body into a plurality of compartments 12 and 13. The upper end of the hopper body is inclined and has hinged to the rear edge thereof as at 14 the swinging cover 15. The front edges of the side walls and partition 11 are inclined inwardly and downwardly as at 16 and the lower edges of the side walls of the hopper body and the partition 11 are inclined upwardly and outwardly as at 17. The lower portion of the front wall of the hopper body is inclined downwardly and inwardly as at 18 and the lower edge of the same terminates an appreciable distance above the point of intersection of the inclined edges 16 and 17 to provide a feeding mouth 19. A reticulated feeding basket 20 having a horizontal bottom wall 21 which is upwardly and outwardly inclined as at 22 at the rear thereof to conform to the inclination of the bottom edges 17 of the hopper and partition, is provided. The basket is further provided with front and side walls 23 and 24, the upper edges of which are disposed above the lower edge of the inclined portion 18 of the front wall of the hopper.

In use of the device which is preferably employed for feeding grit, or oyster shells, the same are stored in the compartments 12 and 13 and gravitate into the basket until it is filled to a level with the lower edge of the inclined portion 18 of the front wall. As the contents are used, the remainder in the hopper will feed by gravity into the feeding basket 20. The formation of the basket will permit dirt, husks or other foreign particles to sift therethrough as the contents feed from the hopper into the basket. The lower portion of the partition 11 is provided with a forwardly projecting extension 25, which separates the feeding basket into two compartments.

While there has been illustrated and described a single and preferred form of the invention, it is to be understood that the right is reserved to embodiments other than those actually illustrated herein, to the full extent indicated by the general meaning of the terms in which the claims are expressed and by variations in the phraseology of the same.

Having thus described my invention, I claim as new and desired to secure by Letters Patent:

1. A poultry feeder comprising a hopper of rectangular formation in cross section and provided at its lower end with a rearwardly inclined front wall and side walls having forwardly and downwardly inclined bottom edges, said front wall terminating above the lower ends of the side walls, and a feed trough consisting of a wire mesh basket projecting from the front of said hopper at the lower end thereof and provided with a rearward extension secured to the rear wall of the hopper and at its side edges to the bottom side edges of the side wall.

2. In a device as characterized in claim 1 in which a central partition is provided and vertically disposed within the hopper, said partition being provided at its lower extremity with a forwardly projecting extension slitted to receive the lower inclined portion of the front wall.

CONSTANT J. PFEIFER.